(12) United States Patent
Fujinami

(10) Patent No.: US 7,804,654 B2
(45) Date of Patent: Sep. 28, 2010

(54) TRANSFER METHOD, TRANSFER APPARATUS, AND RECORDING MEDIUM

(75) Inventor: Tatsuya Fujinami, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 415 days.

(21) Appl. No.: 12/028,540

(22) Filed: Feb. 8, 2008

(65) Prior Publication Data
US 2009/0034108 A1 Feb. 5, 2009

(30) Foreign Application Priority Data
Feb. 9, 2007 (JP) ............................. 2007-031120

(51) Int. Cl.
*G11B 5/86* (2006.01)
(52) U.S. Cl. ........................................................ 360/16
(58) Field of Classification Search ................... 360/16, 360/17, 69, 55
See application file for complete search history.

(56) References Cited

U.S. PATENT DOCUMENTS

| | | | | |
|---|---|---|---|---|
| 3,281,241 | A * | 10/1966 | Mihajlov | 430/50 |
| 3,499,134 | A * | 3/1970 | Klosterman | 200/257 |
| 4,054,383 | A | 10/1977 | Lin et al. | |
| 6,433,944 | B1 * | 8/2002 | Nagao et al. | 360/16 |
| 6,636,371 | B1 | 10/2003 | Komatsu et al. | |
| 6,839,192 | B2 * | 1/2005 | Kamatani | 360/17 |
| 6,906,875 | B2 * | 6/2005 | Kamatani et al. | 360/17 |
| 6,909,563 | B2 * | 6/2005 | Nishikawa et al. | 360/16 |
| 6,950,252 | B2 * | 9/2005 | Nishikawa et al. | 360/17 |
| 7,009,790 | B2 * | 3/2006 | Nishikawa et al. | 360/17 |
| 7,079,336 | B2 * | 7/2006 | Kamatani et al. | 360/17 |
| 7,105,238 | B2 * | 9/2006 | Ozawa et al. | 428/826 |
| 7,119,973 | B2 * | 10/2006 | Kamatani | 360/17 |
| 7,294,441 | B2 * | 11/2007 | Baker et al. | 399/38 |
| 7,420,757 | B2 * | 9/2008 | Kamatani et al. | 360/17 |
| 7,477,463 | B2 * | 1/2009 | Yasunaga et al. | 360/16 |
| 7,632,434 | B2 * | 12/2009 | Duescher | 264/12 |
| 2003/0189273 | A1 | 10/2003 | Olsson | |
| 2004/0040668 | A1 | 3/2004 | Kamatani | |
| 2004/0105183 | A1 * | 6/2004 | Kamatani | 360/17 |
| 2004/0160691 | A1 * | 8/2004 | Kubota | 360/16 |

(Continued)

FOREIGN PATENT DOCUMENTS

EP 1 143 422 A2 10/2001

(Continued)

OTHER PUBLICATIONS

EP Communication, dated Mar. 6, 2009, issued in corresponding EP Application No. 08002468.0, 7 pages.

(Continued)

*Primary Examiner*—Fred Tzeng
(74) *Attorney, Agent, or Firm*—Sughrue Mion, PLLC

(57) ABSTRACT

A transfer method for transferring asperities formed on a master carrier or transfer information represented by the asperities onto a slave medium, comprises the step of bringing the master carrier on which microscopic asperities are formed into close contact with the slave medium by pressing the master carrier by pressure of fluid in a direct manner or an indirect manner through a flexible film. Deformation of the master carrier or the flexible film in a pressed region where the pressure of the fluid is applied is prevented, and transfer is performed while the master carrier is in close contact with the slave medium.

17 Claims, 12 Drawing Sheets

U.S. PATENT DOCUMENTS

| | | |
|---|---|---|
| 2005/0111124 A1* | 5/2005 | Nishikawa et al. ............ 360/16 |
| 2005/0145119 A1 | 7/2005 | Tan et al. |
| 2006/0216371 A1 | 9/2006 | Homola et al. |

FOREIGN PATENT DOCUMENTS

| | | |
|---|---|---|
| EP | 1 538 482 A1 | 6/2005 |
| JP | 2001-014667 A | 1/2001 |
| JP | 2004-086995 A | 3/2004 |
| KR | 1020010093638 A | 10/2001 |
| WO | 01/42858 A1 | 6/2001 |

OTHER PUBLICATIONS

Ishida et al., "Magnetic Printing Technology—Application to HDD," IEEE Transactions on Magnetics, vol. 39, No. 2, Mar. 2003, pp. 628-632.

* cited by examiner

FIG.12

| No. | INNER SPACER | | OUTSIDE SPACER | | SPACE IN IN-PLANE DIRECTION | | MAXIMUM SPACE IN THICKNESS DIRECTION (mm) | OUT-OF-ROUNDNESS (nm) |
|---|---|---|---|---|---|---|---|---|
| | OUTSIDE DIAMETER (mm) | THICKNESS (mm) | INNER DIAMETER (mm) | THICKNESS (mm) | INNER DIAMETER (mm) | OUTSIDE DIAMETER (mm) | | |
| 1 | 19.95 | 1.13 | 65.05 | 1.13 | 0.05 | 0.05 | 0.03 | 218 |
| 2 | 19.90 | 1.15 | 65.10 | 1.15 | 0.10 | 0.10 | 0.05 | 322 |
| 3 | 19.70 | 1.20 | 65.30 | 1.20 | 0.30 | 0.30 | 0.10 | 401 |
| 4 | 19.50 | 1.30 | 65.50 | 1.30 | 0.50 | 0.50 | 0.20 | 498 |
| 5 | 19.30 | 1.60 | 65.70 | 1.60 | 0.70 | 0.70 | 0.50 | 754 |
| 6 | NOT USED | | 70.0 | 1.6 | 10.0 | 2.5 | 1.10 | 2110 |

TRANSFER METHOD, TRANSFER APPARATUS, AND RECORDING MEDIUM

BACKGROUND OF THE INVENTION

1. Field of the Invention

The present invention relates to a transfer method, transfer apparatus, and recording medium for transferring, from a master carrier having microscopic asperities formed thereon, one of the asperities and transfer information represented by the asperities onto a slave medium.

2. Description of the Related Art

There has recently been a demand for size reduction and capacity increase in various information recording media such as a magnetic disk, optical disk, and magneto-optical disk. Additionally, the widespread use of mobile terminals and other factors has increased the demand for the downsizing of devices such as an electronic device and optical device and the mass production of the devices. Against this background, for example, recording media have decreased to several tens to hundreds of nm in the track width of recorded recording signal bits, the magnetization reversal interval in a linear recording direction, and the like.

To accurately retrieve information from such a recording medium having a narrow track pitch, it is necessary for a head which reads and writes information to accurately perform scanning within a narrow track width. Servo signals for tracking, address information signals, reproduction clock signals, and the like are preformatted and recorded on a magnetic disk at predetermined intervals to perform tracking servo control for a magnetic head.

Although the recording can also be performed by a magnetic head, batch transfer from a master disk serving as a master carrier having format information and address information written thereon is more efficient and preferable. For example, there is proposed a magnetic transfer method in which a master disk having a magnetic layer with an asperity pattern corresponding to information to be transferred is prepared for a slave disk serving as a slave medium which is a high-density magnetic recording medium, a magnetic layer of the slave disk is initially magnetized in one direction along tracks, and then a transfer magnetic field is applied to the magnetic layer in a direction almost opposite to the initial magnetization direction while the initially magnetized slave disk and master disk are in close contact (see, e.g., Japanese Patent Application Laid-Open No. 2001-14667).

There are problems such as generation of erased noise or crosstalk noise between adjacent tracks caused by an increase in track density and demagnetization due to thermal fluctuation in recording magnetization caused by an increase in linear recording density. To cope with these problems, there are also proposed magnetic recording media of types called discrete track medium and patterned medium.

In a magnetic recording medium of a type called discrete track medium or patterned medium, a surface thereof needs to be patterned into a predetermined shape. In patterning, since microfabrication of the whole of a recording medium is difficult, an imprinting method in which a master disk (stamper) having a predetermined pattern formed thereon is pressed against a slave disk to transfer the pattern on the master disk onto the slave disk is used, as in the mass production of small electronic devices or optical devices.

In any of the above-described recording medium transfer methods, it is important to uniformly press a master disk and slave disk all over the surfaces and bring the disks into close contact with each other. If there is a portion exhibiting poor adhesion, a signal dropout occurs in transferred information, and the signal quality deteriorates. For example, if recorded signals are servo signals, a satisfactory tracking function cannot be obtained, and the reliability decreases. To cope with such a problem, there is proposed a magnetic transfer apparatus holder for holding a master disk which is provided with a shock absorbing material to improve adhesion (see, e.g., Japanese Patent Application Laid-Open No. 2004-86995).

However, there are limits to the machining accuracy of a holder and shock absorbing material in pressing using the holder and shock absorbing material. Accordingly, a master carrier may be deformed at the time of pressing to cause a difference between a pattern on the master carrier and a transferred pattern, depending on the machining accuracy of the members.

Fluid pressurization is conceivable as a method for uniformly pressing a master carrier regardless of machining accuracy. However, even by this method, a master carrier directly pressed by fluid may be deformed. Or, when a master carrier is indirectly pressed through a flexible film which is interposed between the fluid and the master carrier, the flexible film may be deformed, consequently, the master carrier may also be deformed because the deformed flexible film drags the master carrier by friction. Therefore, use of the method without change is difficult.

SUMMARY OF THE INVENTION

The present invention has been made in consideration of the above-described problems, and has as its object to provide a transfer method, transfer apparatus, and recording medium for reproducing, with fidelity, asperities formed on a master carrier or transfer information represented by the asperities on a slave medium without deforming the master carrier.

In order to achieve the above-described object, according to an aspect of the present invention, when bringing a master carrier on which microscopic asperities are formed into close contact with a slave medium by pressing the master carrier by pressure of fluid in a direct manner or an indirect manner through a flexible film, and transferring the asperities or transfer information represented by the asperities onto the slave medium, deformation of the master carrier or the flexible film in a pressed region where the pressure by the fluid is applied is prevented, and transfer is performed while the master carrier is in close contact with the slave medium.

According to this aspect, master carriers on which asperities are formed are brought into close contact with a surface of a slave medium. The slave medium whose surface is in close contact with the master carriers is placed in a closed container, and fluid such as compressed air is enclosed in the container. The master carrier is uniformly pressed all over surface by the enclosed fluid in a direct manner or an indirect manner through a flexible film which is in close contact with the master carrier and is brought into close contact with the slave medium.

At this time, deformation of the master carriers or the flexible films in pressed regions under pressure by the fluid is prevented. This makes it possible to transfer asperities on the master carrier and transfer information represented by the asperities, onto the slave medium with fidelity in the order of nanometers.

According to another aspect of the present invention, in the above-described aspect, the deformation of the master carrier or the flexible film in the pressed region is prevented by adjusting a width of a space left in an in-plane direction of the slave medium and a width of a space left in a thickness direction of the slave medium.

According to this aspect, widths of slight space left in an in-plane direction of the slave medium and a thickness direction of the slave medium are adjusted to be small. The width of the space left in the in-plane direction of the slave medium may be adjusted to be not more than five times a thickness of the master carrier or the flexible film. The width of the space left in the thickness direction of the slave medium may be adjusted to be not more than 0.2 mm.

This prevents the master carrier or the flexible film from being deformed to cave in toward the spaces and makes it possible to transfer one of asperities on the master carrier and transfer information represented by the asperities onto the slave medium with fidelity in the order of nanometers.

According to another aspect of the present invention, in the above-described aspects, the space left in the in-plane direction of the slave medium is a space left between the slave medium and a spacer which is arranged in an inner periphery or an outer periphery of the slave medium at the time of transfer and has a shape corresponding to a shape of the inner periphery of the slave medium or a shape corresponding to a shape of the outer periphery of the slave medium, and the width of the space left in the in-plane direction of the slave medium is adjusted based on the shape of the spacer.

According to this aspect, a size of a shape of the inner periphery of the spacer arranged in the inner periphery of a slave medium and a size of a shape of the outer periphery of the spacer arranged in the outer periphery of the slave medium are selected based on the size of the slave medium in the corresponding region.

With this selection, the space left in an in-plane direction of the slave medium is adjusted to reduce deformation of the flexible film or the master carrier at a portion corresponding to the space in the in-plane direction, and it becomes possible to transfer the asperities on the master carrier or transfer information represented by the asperities onto the slave medium with fidelity in the order of nanometers.

According to another aspect of the present invention, in the above-described aspects, the space left in the thickness direction of the slave medium is a space left between the master carrier and the flexible film, and the width of the space is adjusted based on a thickness of the spacer arranged in the one of the inner periphery and the outer periphery of the slave medium at the time of transfer.

According to this aspect, a thickness of a spacer arranged in an inner periphery of the slave medium and a thickness of a spacer arranged in an outer periphery of the slave medium are selected based on thicknesses of the master carrier and the slave medium.

With this selection, the space left in the thickness direction of the slave medium is adjusted to reduce deformation of the flexible film at a portion corresponding to the space in the thickness direction, and it becomes possible to transfer the asperities on the master carrier or transfer information represented by the asperities onto the slave medium with fidelity in the order of nanometers.

According to another aspect of the present invention, in the above-described aspects, the space left in the thickness direction of the slave medium is a space left between the master carrier and the slave medium, and the width of the space is adjusted based on a thickness of the spacer arranged in the inner periphery or the outer periphery of the slave medium at the time of transfer.

According to this aspect, a thickness of the spacer arranged in the inner periphery of the slave medium and a thickness of the spacer arranged in the outer periphery of the slave medium are selected based on a thickness of the slave medium.

With this selection, the space left in the thickness direction of the slave medium is adjusted to reduce deformation of a master carrier at a portion corresponding to the space in the thickness direction, and it becomes possible to transfer the asperities on the master carrier or transfer information represented by the asperities onto the slave medium with fidelity in the order of nanometers.

According to another aspect of the present invention, in the above-described aspects, the width of the space left in the in-plane direction of the slave medium is adjusted by a position where an edge of the master carrier or the flexible film is fixed.

According to this aspect, when an edge of the master carrier or the flexible film is to be fixed to a transfer apparatus, the master carrier or the flexible film is fixed by adhesion or the like at a position where the width of the space left in the in-plane direction of the slave medium becomes not more than five times a thickness of the master carrier or the flexible film.

With this fixation, the space left in the in-plane direction of the slave medium is adjusted to reduce deformation of the master carrier or the flexible film at a portion corresponding to the space in the in-plane direction, and it becomes possible to transfer the asperities on the master carrier or the transfer information represented by the asperities onto the slave medium with fidelity in the order of nanometers.

As has been described above, according to a transfer method, transfer apparatus, and recording medium according to aspects of the present invention, deformation of a master carrier in close contact with surface of a slave medium is prevented, and it becomes possible to reproduce asperities formed on the master carriers or transfer information represented by the asperities on the slave medium with fidelity.

BRIEF DESCRIPTION OF THE DRAWINGS

FIG. 12 is a chart showing data obtained when pieces of transfer information were transferred according to the first embodiment.

DETAILED DESCRIPTION OF THE PREFERRED EMBODIMENTS

Preferred embodiments of a transfer method, transfer apparatus, and recording medium according to the present invention will be described in detail below with reference to the accompanying drawings.

Figure 1:
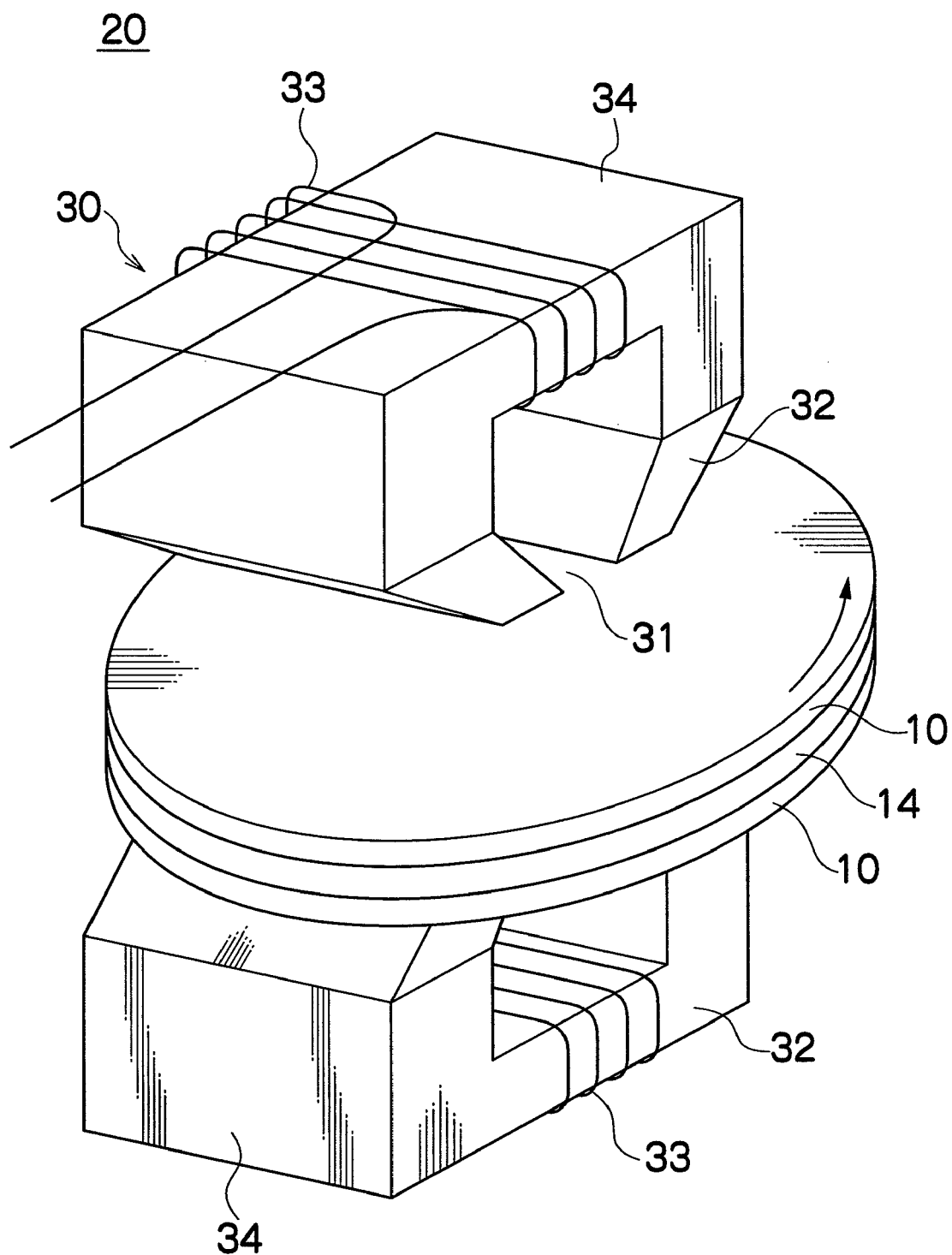
FIG. 1 is a perspective view of a main portion of a magnetic transfer apparatus which performs magnetic transfer.

A magnetic transfer method that is a technique for producing hard disks or the like to which a transfer method and transfer apparatus according to the present invention are applied will be described first. FIG. 1 is a perspective view of a main portion of a magnetic transfer apparatus 20 for performing magnetic transfer using master disks 10 as master carriers.

Figure 3A:
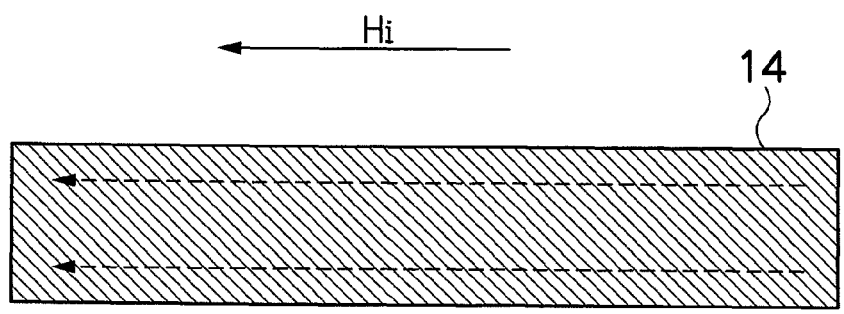
FIGS. 3A and 3B are views showing basic processes of a magnetic transfer method.

At the time of magnetic transfer, slave surfaces (magnetic recording surfaces) of a slave disk 14 as a slave medium after initial DC magnetization (to be described later) shown in FIG. 3A are made to contact information bearing surfaces 13 of the master disks 10 as the master carriers and are brought into close contact with the information bearing surfaces 13 by a predetermined pressing force. While the slave disk 14 and master disks 10 are in close contact with each other, transfer magnetic fields are applied by a magnetic field generating device 30 to magnetically transfer asperity patterns P as pieces of transfer information formed on the master disks 10 onto the slave disk 14.

The slave disk 14 is a disk-shaped recording medium such as a hard disk or flexible disk which has magnetic recording layers formed on two surfaces. Before being brought into contact with the master disks 10, the slave disk 14 is subjected as needed to cleaning processing (e.g., varnishing) for removing microscopic projections or dust at the surfaces by a glide head, abrasive body, or the like.

Coated magnetic recording layers, plated magnetic recording layers, or metal thin-film magnetic recording layers can be adopted as the magnetic recording layers of the slave disk 14. Available magnetic materials for a metal thin-film magnetic recording layer include Co, Co alloys (e.g., CoPtCr, CoCr, CoPtCrTa, CoPtCrNbTa, CoCrB, and CoNi), Fe, Fe alloys (e.g., FeCo, FePt, and FeCoNi), Ni, and Ni alloys (e.g., NiFe). These substances are preferable because they each have a high magnetic flux density and a magnetic anisotropy in the same direction as that of an applied magnetic field (in-plane direction in the case of in-plane recording), which allow clear transfer. It is preferable to provide a non-magnetic underlayer to give a required magnetic anisotropy under the magnetic material (to the side of a support). It is necessary to make the crystal structure and lattice constant of the underlayer coincide with those of magnetic layers 12. For this purpose, it is preferable to use Cr, CrTi, CoCr, CrTa, CrMo, NiAl, Ru or the like as the material for the underlayer.

Figure 2:
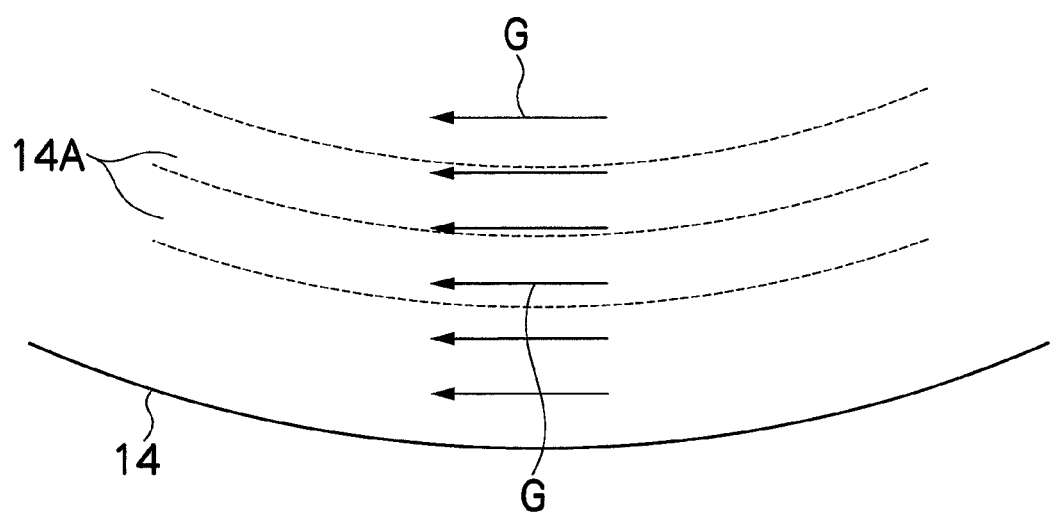
FIG. 2 is a plan view showing a method for applying a transfer magnetic field.

The magnetic field generating device 30 for applying transfer magnetic fields has electromagnet devices 34, each composed of a core 32 having a gap 31 extending in the radial direction of a combination of the slave disk 14 and master disks 10 that are held in close contact with each other and a coil 33 wound therearound, on two sides of the combination to apply transfer magnetic fields whose lines G (see FIG. 2) of magnetic force are in the same direction along tracks. FIG. 2 is a view showing the relationship between circumferential tracks 14A and the lines G of magnetic force.

At the time of magnetic field application, transfer magnetic fields are applied by the magnetic field generating device 30 while integrally rotating the slave disk 14 and master disks 10, thereby magnetically transferring pieces of transfer information represented by asperity patterns on the master disks 10 onto the slave surfaces of the slave disk 14. Note that the magnetic field generating device may be rotationally moved instead of the above-described configuration.

In each transfer magnetic field, there is generated, in a portion of a track, a magnetic field having a magnetic field intensity distribution in which there is no magnetic field intensity exceeding the upper limit of an optimum transfer magnetic field intensity range (0.6 to 1.3 times a coercive force Hc of the slave disk 14) in any direction along tracks, the magnetic field intensity is within the optimum transfer magnetic field intensity range at least one position in one direction along the tracks, and the magnetic field intensity is less than the lower limit of the optimum transfer magnetic field intensity range at any position in the opposite direction along the tracks.

Figure 3B:
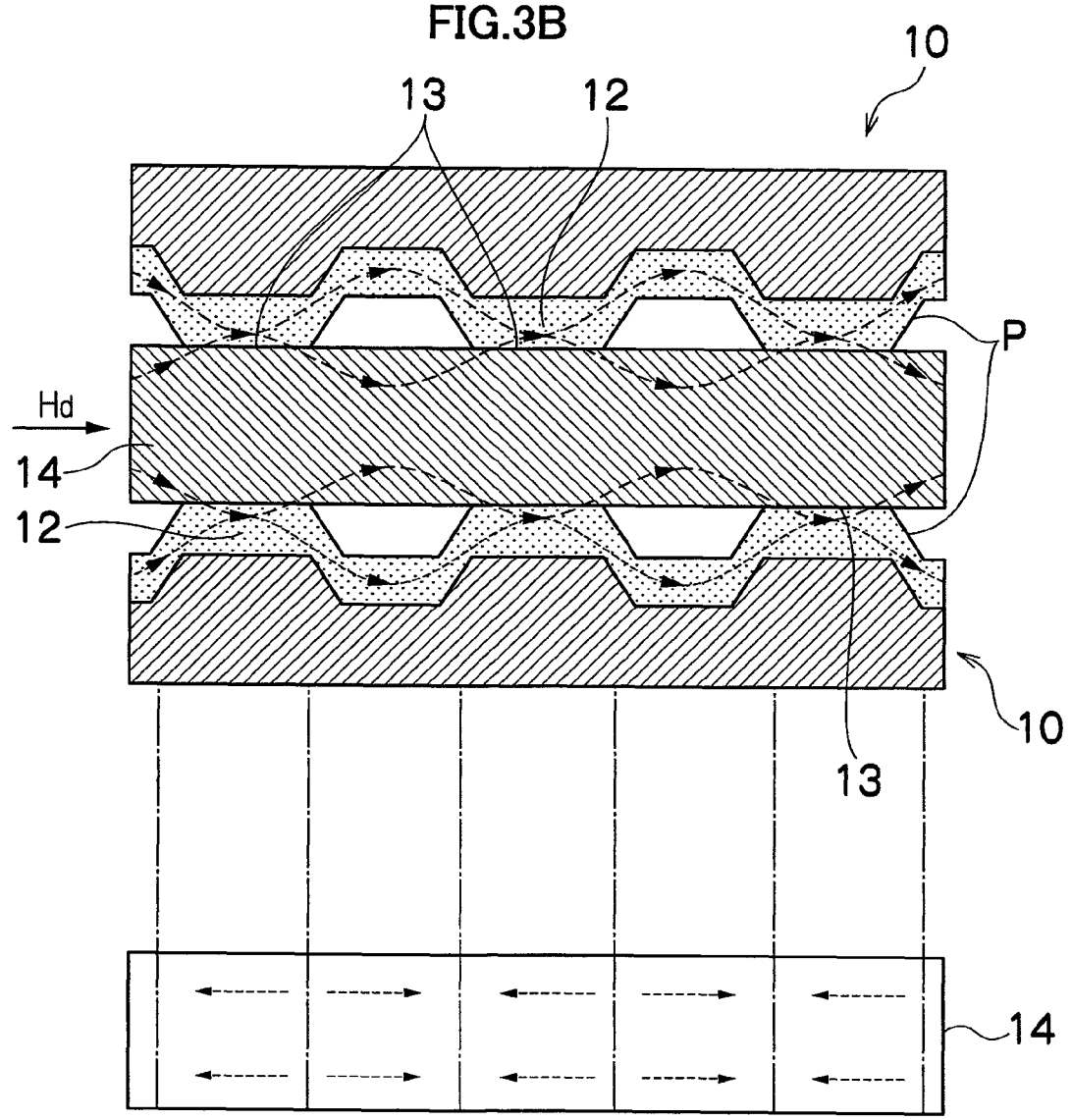

FIGS. 3A and 3B are views for explaining basic processes of a magnetic transfer method using in-plane recording.

First, as shown in FIG. 3A, an initial magnetic field Hi is applied to the slave disk 14 in one direction along the tracks in advance to subject the slave disk 14 to initial magnetization (DC demagnetization). As shown in an upper portion of FIG. 3B, each recording surface (magnetic recording portion) of the slave disk 14 and the information bearing surface 13 of the corresponding master disk 10 having the asperity pattern P formed thereon are then brought into close contact with each other, and a transfer magnetic field Hd is applied in a direction along the tracks of the slave disk 14 opposite to that for the initial magnetic field Hi, thereby performing magnetic transfer. Since the transfer magnetic field Hd is absorbed at projections of the asperity patterns P of the magnetic layers 12, the magnetization directions for the portions are not reversed while those for the remaining portions are reversed. As a result, as shown in a lower portion of FIG. 3B, pieces of transfer information represented by the asperity patterns P of the master disks 10 are magnetically transferred and recorded onto the magnetic recording surfaces of the slave disk 14.

Figure 4:
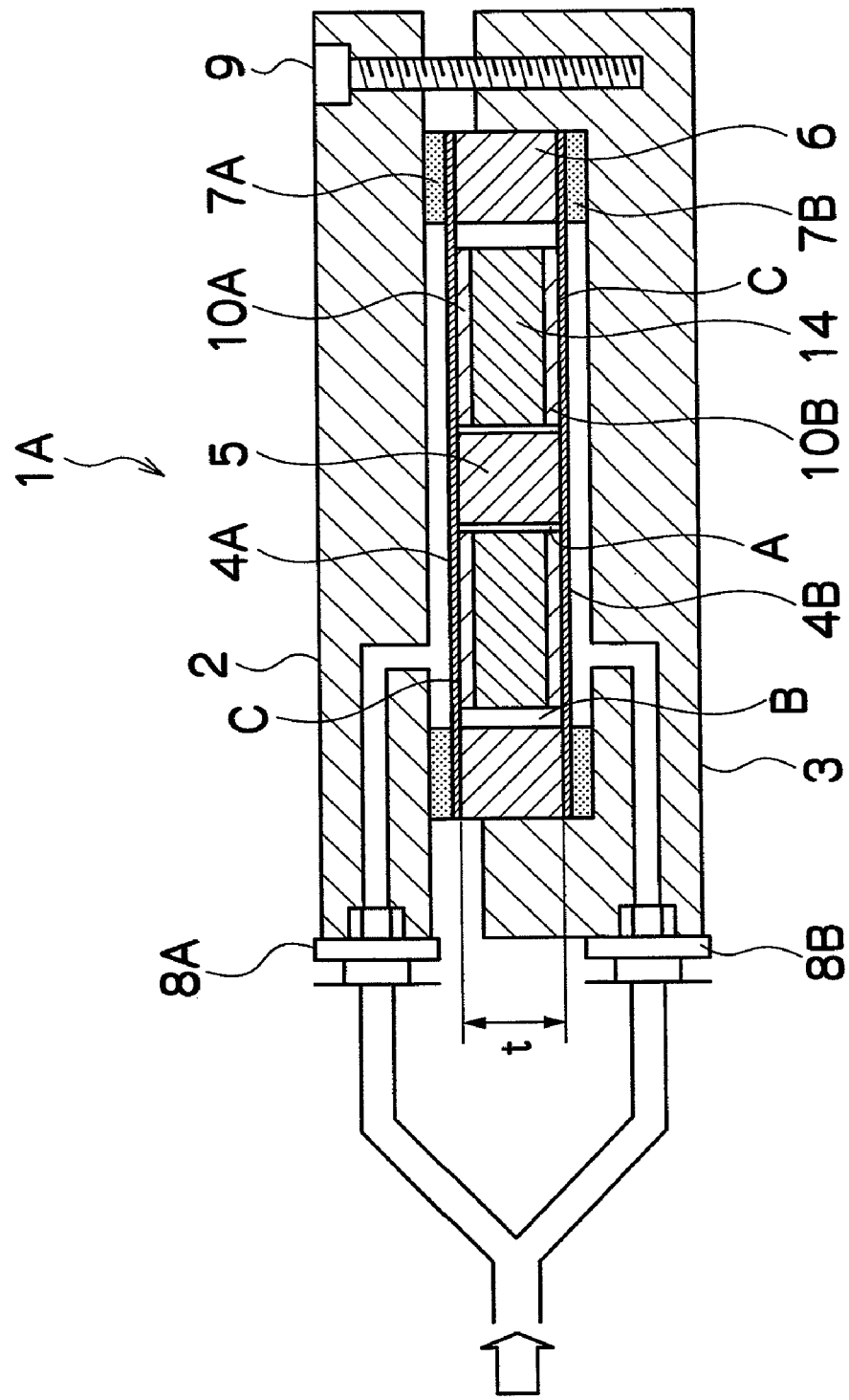
FIG. 4 is a sectional view showing a first embodiment of the present invention.

A transfer method, transfer apparatus, and recording medium according to the present invention will now be described. FIG. 4 is a sectional view showing a first embodiment of a transfer method and transfer apparatus according to the present invention.

A transfer apparatus 1A is divided into a container upper portion 2 and a container lower portion 3. The container upper and lower portions 2 and 3 unite together with a fastening device 9 such as a bolt or air cylinder. At the container upper portion 2 is provided a joint 8A which serves as an inlet for fluid supplied to bring a master carrier into close contact with a slave medium. A joint 8B is also provided at the container lower portion 3.

Pipes connected to the joints 8A and 8B branch from a common pipe connected to a fluid source (not shown) as a pressure device which generates fluid such as compressed air. With this configuration, fluids with a single pressure are respectively supplied to the container upper portion 2 and container lower portion 3 through the joints 8A and 8B.

Master disks 10A and 10B serving as master carriers and a slave disk 14 serving as a slave medium are housed in the container upper portion 2 and container lower portion 3 such that information bearing surfaces of the master disks 10A and 10B are in close contact with two respective surfaces of the slave disk 14.

In the center portion which is inner side of the slave disk 14 and master disks 10A and 10B, a columnar inside spacer 5 having an external shape corresponding to the shapes of the inner sides (center portion) of the slave disk 14 and master disks 10A and 10B is arranged. Around the outer periphery which is outer side of the slave disk 14 and master disks 10A and 10B, a ring-shaped outside spacer 6 having an internal shape corresponding to the external shapes of outer side (periphery portion) of the slave disk 14 and master disks 10A and 10B is arranged Sealing members 7A and 7B made of, e.g., nitrile rubber, are respectively provided above and below the outside spacer 6. Sheets 4A and 4B which are flexible films made of, e.g., a stainless material or PET resin for pressing the master disks 10A and 10B are respectively held between the outside spacer 6 and the sealing members 7A and 7B. The slave disk 14 and master disks 10A and 10B are housed between the sheets 4A and 4B such that the master disks 10A and 10B are in close contact with the two surfaces of the slave disk 14.

The outside diameter of the inside spacer 5 is slightly smaller than the inside diameters of the slave disk 14 and master disks 10A and 10B, and a space A is left between the inside spacer 5 and the slave disk 14 and master disks 10A and 10B. The inside diameter of the outside spacer 6 is slightly larger than the outside diameters of the slave disk 14 and master disks 10A and 10B, and a space B is left between the outside spacer 6 and the slave disk 14 and master disks 10A and 10B.

Thicknesses t of the inside spacer 5 and outside spacer 6 are slightly larger than the sum of the thicknesses of the slave disk 14 and master disks 10A and 10B, and spaces C are left between the sheet 4A and the master disk 10A and between the sheet 4B and the master disk 10B.

At this time, the outside diameter of the inside spacer 5 and the inside diameter of the outside spacer 6 are selected based on the inside and outside diameters of the slave disk 14 and master disks 10A and 10B such that the width of each of the spaces A and B is adjusted to not more than five times the thickness of the sheet 4A or 4B.

The thicknesses t of the inside spacer 5 and outside spacer 6 are selected not to be larger than the sum of the thicknesses of the slave disk 14 and master disks 10A and 10B by more than 0.2 mm. The width of each space C is adjusted to not more than 0.2 mm.

Figure 8:
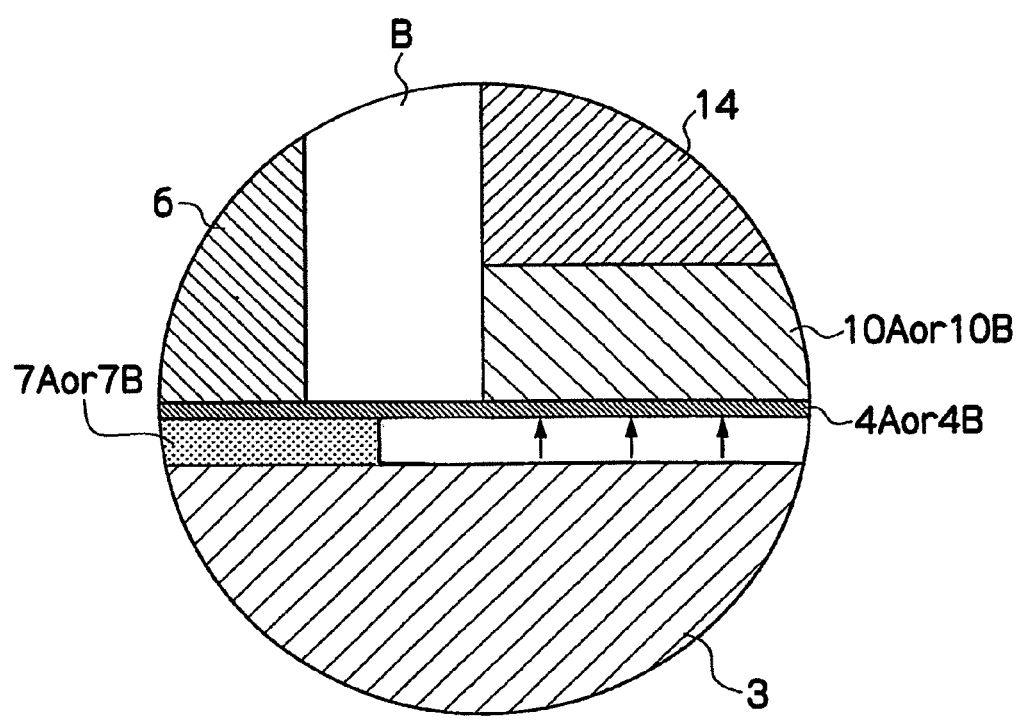
FIG. 8 is an enlarged sectional view showing a fixed state in the first embodiment of the present invention.

FIG. 8 is an enlarged sectional view showing a fixed state in the first embodiment of the present invention. By making the inside diameter of the sealing member 7A or 7B close to the outside diameter of the slave disk 14, as shown in FIG. 8, and fixing the sheet 4A or 4B to the sealing member 7A or 7B, the width of a portion of the sheet 4A or 4B, the portion is unfixed and adjacent to the space B may be set to not more than five times the thickness of the sheet 4A or 4B.

In the transfer apparatus with the above-described configuration, when the information bearing surfaces of the master disks 10A and 10B having pieces of transfer information such as track signals recorded thereon are to be brought into close contact with the slave disk 14 by a predetermined pressing force, the container upper portion 2 and container lower portion 3 are first coupled together by the fastening device 9. This operation forms a void surrounded by the container upper portion 2, sealing member 7A, and sheet 4A and a void surrounded by the container lower portion 3, sealing member 7B, and sheet 4B.

In this state, fluid with a pressure of 0.1 to 1 MPa is supplied to the voids from the fluid source (not shown) through the respective joints 8A and 8B. With this operation, the sheets 4A and 4B are uniformly pressed all over pressed regions whose widths are equal to the inside diameters of the sealing members 7A and 7B. Letting d be a thickness and E be a Young's modulus and assuming that the widths of the pressed regions under the pressure of the fluid are 1 m, the sheets 4A and 4B each have a rigidity which satisfies the following relation: $d^3E/12 \leqq 8 N \cdot m^2$.

The pressing force of the fluid is transmitted to the master disks 10A and 10B through the sheets 4A and 4B, and the pressed master disks 10A and 10B come into close contact with the slave disk 14 with predetermined pressing forces. Since the pressing forces are produced by fluid, pressurization is uniform over the pressed regions. In addition, since the fluid is supplied from a single pipeline, the pressing forces applied to master disks 10A and 10B in close contact with the two surfaces of the slave disk 14 are equal.

The sheets 4A and 4B are adjusted such that they do not cave in toward the adjusted spaces A and B and that the amount of deformation in each pressed region is small. The sheets 4A and 4B are also adjusted such that the amount of deformation at a portion corresponding to each space C is small. Accordingly, the sheets 4A and 4B press the master disks 10A and 10B without excessively deforming the master disks 10A and 10B in the pressed regions.

In this state, when manufacturing a recording medium, magnetic transfer is performed according to the above-described magnetic transfer procedure. Pieces of transfer information represented by asperities formed on the master disks 10A and 10B are magnetically transferred onto the slave disk 14 with fidelity in the order of nanometers.

Figure 5:
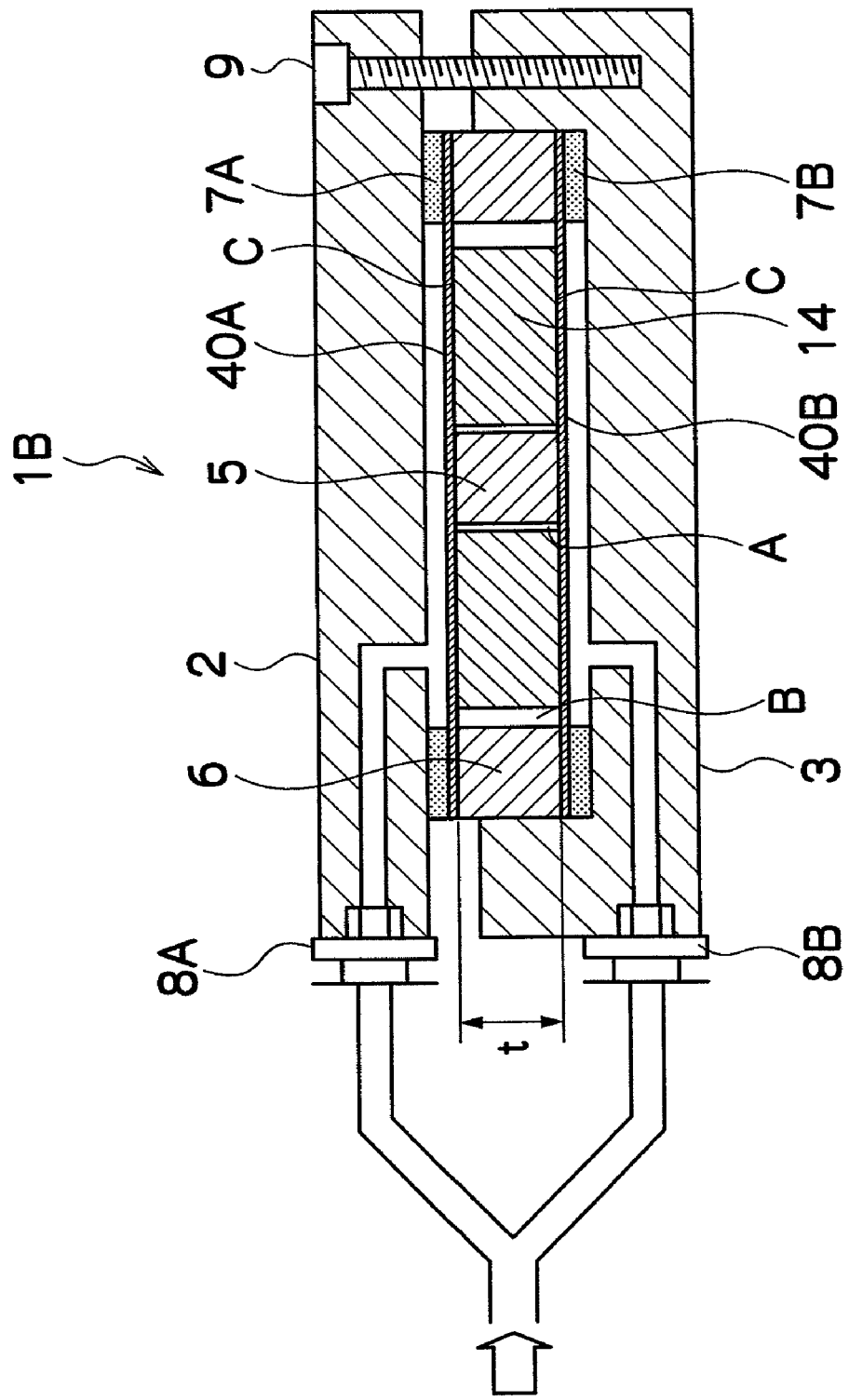
FIG. 5 is a sectional view showing a second embodiment of the present invention.

A second embodiment of a transfer method, transfer apparatus, and recording medium according to the present invention will be described. FIG. 5 is a sectional view showing the second embodiment.

A transfer apparatus 1B is divided into a container upper portion 2 and a container lower portion 3. The container upper and lower portions 2 and 3 unite together with a fastening device 9. At the container upper portion 2 is provided a joint 8A which serves as an inlet for fluid. A joint 8B is also provided at the container lower portion 3.

Pipes connected to the joints 8A and 8B branch from a common pipe connected to a fluid source (not shown). With this configuration, fluids with a single pressure are respectively supplied to the container upper portion 2 and container lower portion 3 through the joints 8A and 8B.

Master disks 40A and 40B serving as master carriers and a slave disk 14 serving as a slave medium are housed in the container upper portion 2 and container lower portion 3 such that the slave disk 14 is sandwiched between the master disks 40A and 40B.

A columnar inside spacer 5 is arranged in the center of the slave disk 14, and a ring-shaped outside spacer 6 is arranged around the outer periphery of the slave disk 14. Sealing members 7A and 7B are respectively provided above and below the outside spacer 6. Edges of the master disks 40A and 40B are held by the outside spacer 6 and sealing members 7A and 7B.

The outside diameter of the inside spacer 5 is slightly smaller than the inside diameter of the slave disk 14, and a space A is left between the inside spacer 5 and the slave disk 14. The inside diameter of the outside spacer 6 is slightly larger than the outside diameter of the slave disk 14, and a space B is left between the outside spacer 6 and the slave disk 14.

Thicknesses t of the inside spacer 5 and outside spacer 6 are slightly larger than the thickness of the slave disk 14, and spaces C are left between the slave disk 14 and the master disks 40A and 40B.

At this time, the outside diameter of the inside spacer 5 and the inside diameter of the outside spacer 6 are selected based on the inside and outside diameters of the slave disk 14 such that the width of each of the spaces A and B is adjusted to not more than five times the thickness of the master disk 40A or 40B.

The thicknesses t of the inside spacer 5 and outside spacer 6 are selected not to be larger than the thickness of the slave disk 14 by more than 0.2 mm. The width of each space C is adjusted to not more than 0.2 mm.

Figure 9:
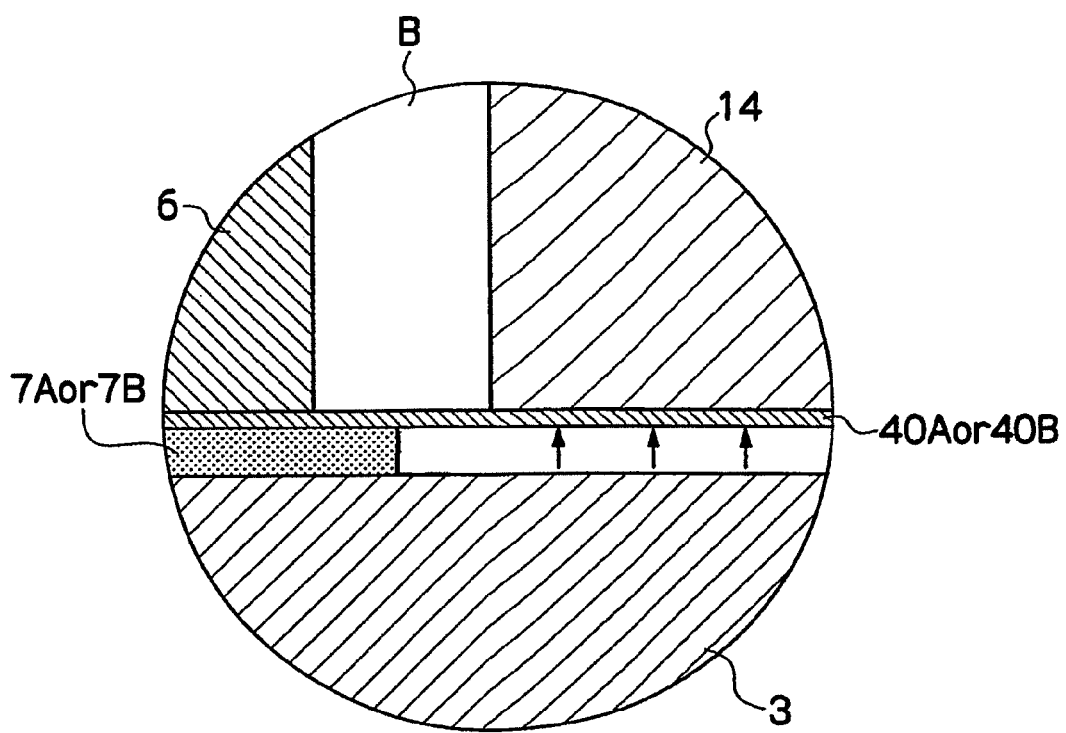
FIG. 9 is an enlarged sectional view showing a fixed state in the second embodiment of the present invention.

FIG. 9 is an enlarged sectional view showing a fixed state in the second embodiment of the present invention. By making the inside diameter of the sealing member 7A or 7B close to the outside diameter of the slave disk 14, as shown in FIG. 9, and fixing the master disk 40A or 40B to the sealing member 7A or 7B, the width of a portion of the master disk 40A or 40B, the portion is unfixed and adjacent to the space B may be set to not more than five times the thickness of the master disk 40A or 40B.

In the transfer apparatus with the above-described configuration, when information bearing surfaces of the master disks 40A and 40B are to be brought into close contact with the slave disk 14 by a predetermined pressing force, the container upper portion 2 and container lower portion 3 are first coupled together by the fastening device 9. This operation forms a void surrounded by the container upper portion 2, sealing member 7A, and master disk 40A and a void surrounded by the container lower portion 3, sealing member 7B, and master disk 40B.

In this state, fluid with a pressure of 0.1 to 1 MPa is supplied to the voids from the fluid source (not shown) through the respective joints 8A and 8B. With this operation, the master disks 40A and 40B are uniformly pressed all over pressed regions whose widths are equal to the inside diameters of the sealing members 7A and 7B. Letting d be a thickness and E be a Young's modulus and assuming that the widths of the pressed regions under the pressure of the fluid are 1 m, the master disks 40A and 40B each have a rigidity which satisfies the following relation: $dE^3/12 \leq 8 N \cdot m^2$.

The pressed master disks 40A and 40B come into close contact with the slave disk 14 with predetermined pressing forces. Since the pressing forces are produced by fluid, pressurization is uniform over the pressed regions. In addition, since the fluid is supplied from a single pipeline, the pressing forces applied to the master disks 40A and 40B in close contact with the two surfaces of the slave disk 14 are equal.

The master disks 40A and 40B are adjusted such that they do not cave in toward the adjusted spaces A and B and that the amount of deformation in each pressed region is small. The master disks 40A and 40B are also adjusted such that the amount of deformation at a portion corresponding to each space C is small.

In this state, when manufacturing a recording medium, magnetic transfer is performed according to the above-described magnetic transfer procedure. Pieces of transfer information represented by asperities formed on the master disks 40A and 40B are magnetically transferred onto the slave disk 14 with fidelity in the order of nanometers.

Figure 6:
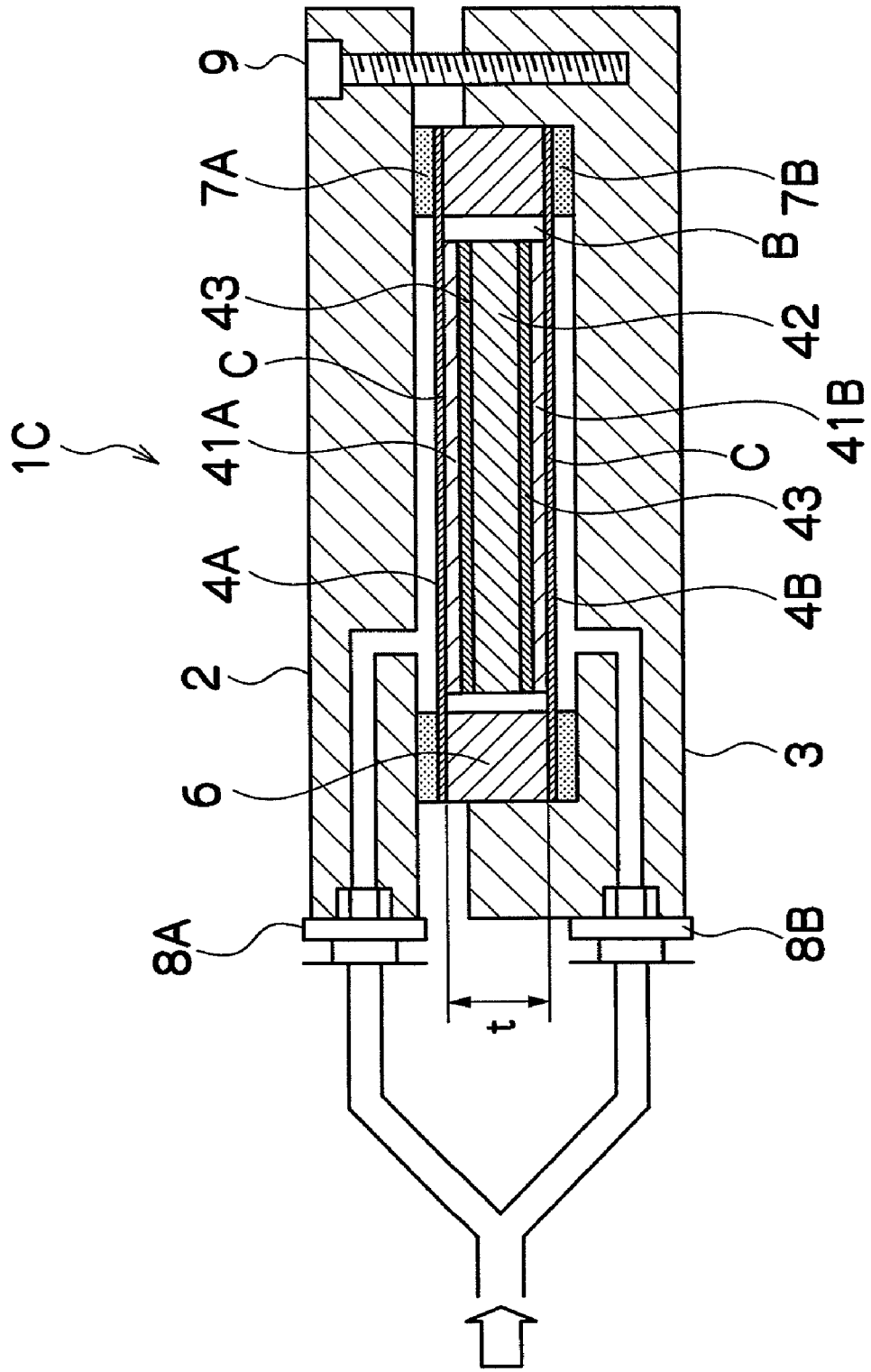
FIG. 6 is a sectional view showing a third embodiment of the present invention.

A third embodiment of a transfer method, transfer apparatus, and recording medium according to the present invention will be described. FIG. 6 is a sectional view showing the third embodiment.

A transfer apparatus 1C is divided into a container upper portion 2 and a container lower portion 3. The container upper and lower portions 2 and 3 unite together with a fastening device 9. At the container upper portion 2, a joint 8A which serves as an inlet for fluid is provided. A joint 8B is also provided at the container lower portion 3.

Pipes connected to the joints 8A and 8B branch from a common pipe connected to a fluid source (not shown). With this configuration, fluids with a single pressure are respectively supplied to the container upper portion 2 and container lower portion 3 through the joints 8A and 8B.

Master disks 41A and 41B serving as master carriers and a slave disk 42 serving as a slave medium are housed in the container upper portion 2 and container lower portion 3 such that the master disks 41A and 41B are in close contact with two respective surfaces of the slave disk 42.

Unlike the slave disk 14, transfer layers 43 made of a resin which is cured by light, heat, or the like or low-melting glass, etc., are provided on the two surfaces of the slave disk 42. Asperities on the master disks 41A and 41B corresponding to the shapes of recording bits or the like are satisfactorily transferred onto the transfer layers 43 by irradiating with light, heating, or cooling the transfer layers 43 while the master disks 41A and 41B are pressed against the transfer layers 43 or after the master disks 41A and 41B are peeled from the transfer layers 43.

A ring-shaped outside spacer 6 is arranged around the outer peripheries of the slave disk 42 and master disks 41A and 41B. Sealing members 7A and 7B are respectively provided above and below the outside spacer 6. Sheets 4A and 4B which are flexible films are respectively held between the outside spacer 6 and the sealing members 7A and 7B. The slave disk 42 and master disks 41A and 41B are housed between the sheets 4A and 4B such that the master disks 41A and 41B are in close contact with the transfer layers 43 on the two surfaces of the slave disk 42.

The inside diameter of the outside spacer 6 is slightly larger than the outside diameters of the slave disk 42 and master disks 41A and 41B, and a space B is left between the outside spacer 6 and the slave disk 42 and master disks 41A and 41B.

Thicknesses t of the outside spacer 6 are slightly larger than the sum of the thicknesses of the slave disk 42, master disks 41A and 41B, and transfer layers 43. In addition, spaces C are left between the sheet 4A and the master disk 41A and between the sheet 4B and the master disk 41B.

At this time, the inside diameter of the outside spacer 6 is selected based on the outside diameters of the slave disk 42 and master disks 41A and 41B such that the width of the space B is adjusted to not more than five times the thickness of the sheet 4A or 4B.

The thickness t of the outside spacer 6 is selected not to be larger than the sum of the thicknesses of the slave disk 42, master disks 41A and 41B, and transfer layers 43 by more than 0.2 mm. The width of each space C is adjusted to not more than 0.2 mm.

Figure 10:
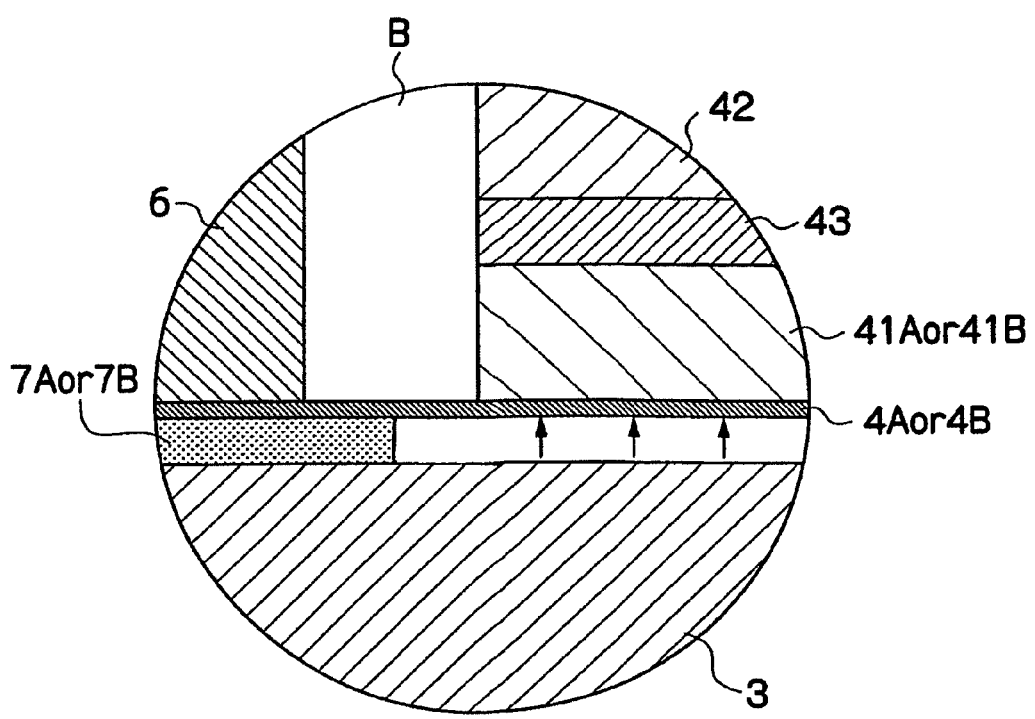
FIG. 10 is an enlarged sectional view showing a fixed state in the third embodiment of the present invention.

FIG. 10 is an enlarged sectional view showing a fixed state in the third embodiment of the present invention. By making the inside diameter of the sealing member 7A or 7B close to the outside diameter of the slave disk 42, as shown in FIG. 10, and fixing the sheet 4A or 4B to the sealing member 7A or 7B, the width of a portion of the sheet 4A or 4B, the portion is unfixed and adjacent to the space B may be set to not more than five times the thickness of the sheet 4A or 4B.

In the transfer apparatus with the above-described configuration, when information bearing surfaces of the master disks 41A and 41B are to be brought into close contact with the transfer layers 43 on the two surface of the slave disk 42 by a predetermined pressing force, the container upper portion 2 and container lower portion 3 are first coupled together by the fastening device 9. This operation forms a void surrounded by the container upper portion 2, sealing member 7A and sheet 4A, and a void surrounded by the container lower portion 3, sealing member 7B and sheet 4B.

In this state, fluid with a pressure of 0.1 to 1 MPa is supplied to the voids from the fluid source (not shown) through the respective joints 8A and 8B. With this operation, the sheets 4A and 4B are uniformly pressed all over pressed regions whose widths are equal to the inside diameters of the sealing members 7A and 7B. Letting d be a thickness and E be a Young's modulus and assuming that the widths of the pressed regions under the pressure of the fluid are 1 m, the sheets 4A and 4B each have a rigidity which satisfies the following relation: $dE^3/12 \leqq 8 N \cdot m^2$.

The pressing force of the fluid is transmitted to the master disks 41A and 41B through the sheets 4A and 4B, and the pressed master disks 41A and 41B come into close contact with the transfer layers 43 with predetermined pressing forces. Since the pressing forces are produced by fluid, pressurization is uniform over the pressed regions. In addition, since the fluid is supplied from a single pipeline, the pressing forces applied to the master disks 41A and 41B in close contact with the transfer layers 43 are equal.

The sheets 4A and 4B are adjusted such that they do not cave in toward the adjusted space B and that the amount of deformation in each pressed region is small. The sheets 4A and 4B are also adjusted such that the amount of deformation at a portion corresponding to each adjusted space C is small. Accordingly, the sheets 4A and 4B press the master disks 41A and 41B without excessively deforming the master disks 41A and 41B in the pressed regions.

The asperities formed on the master disks 41A and 41B are transferred onto the transfer layers 43, against which the master disks 41A and 41B are pressed. The transfer layers 43 are cured by irradiating with light, heating, or cooling the transfer layers 43 while the master disks 41A and 41B are pressed against the transfer layers 43 or after the master disks 41A and 41B are peeled from the transfer layers 43. The asperities as pieces of transfer information are transferred onto the slave disk 42, which becomes a recording medium.

Figure 7:
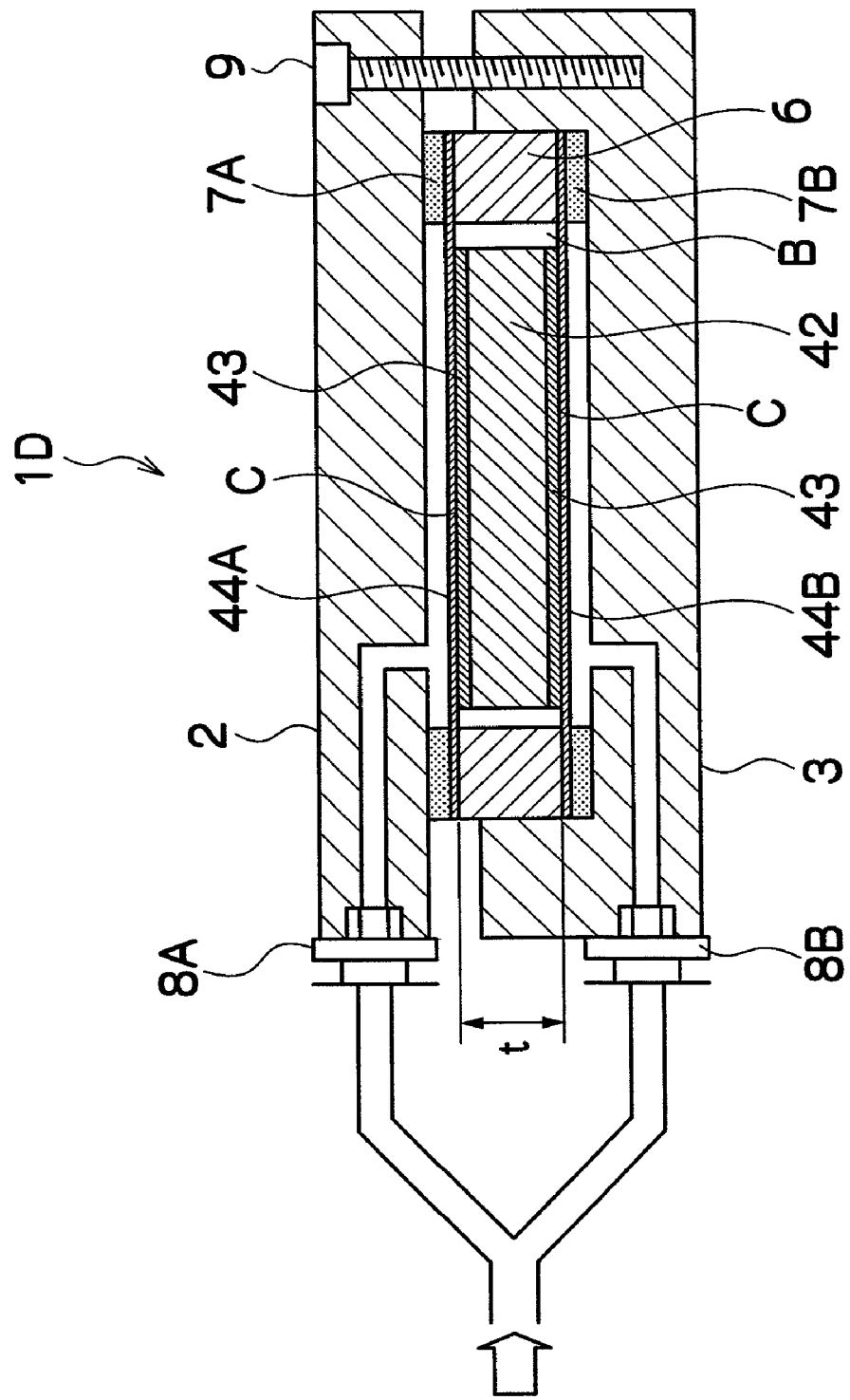
FIG. 7 is a sectional view showing a fourth embodiment of the present invention.

A fourth embodiment of a transfer method, transfer apparatus, and recording medium according to the present invention will be described. FIG. 7 is a sectional view showing the fourth embodiment.

A transfer apparatus ID is divided into a container upper portion 2 and a container lower portion 3. The container upper and lower portions 2 and 3 unite together with a fastening device 9. At the container upper portion 2, a joint 8A which serves as an inlet for fluid is provided. A joint 8B is also provided at the container lower portion 3.

Pipes connected to the joints 8A and 8B branch from a common pipe connected to a fluid source (not shown). With this configuration, fluids with a single pressure are respectively supplied to the container upper portion 2 and container lower portion 3 through the joints 8A and 8B.

Master disks 44A and 44B serving as master carriers and a slave disk 42 serving as a slave medium are housed in the container upper portion 2 and container lower portion 3 such that the slave disk 42 is sandwiched between the master disks 44A and 44B.

Transfer layers 43 made of, a resin which is cured by light, heat, or the like or low-melting glass, etc., are provided on the two surfaces of the slave disk 42. Asperities on the master disks 44A and 44B corresponding to the shapes of recording bits or the like are satisfactorily transferred onto the transfer layers 43 by irradiating with light, heating, or cooling the transfer layers 43 while the master disks 44A and 44B are pressed against the transfer layers 43 or after the master disks 44A and 44B are peeled from the transfer layers 43.

A ring-shaped outside spacer 6 is arranged around the outer periphery of the slave disk 42. Sealing members 7A and 7B are respectively provided above and below the outside spacer 6. Edges of the master disks 44A and 44B are held by the outside spacer 6 and sealing members 7A and 7B.

The inside diameter of the outside spacer 6 is slightly larger than the outside diameter of the slave disk 42, and a space B is left between the outside spacer 6 and the slave disk 42. A thickness t of the outside spacer 6 is slightly larger than the sum of the thicknesses of the slave disk 42 and transfer layers 43, and spaces C are left between the slave disk 42 and the master disks 44A and 44B.

At this time, the inside diameter of the outside spacer 6 is selected based on the outside diameter of the slave disk 42 such that the width of the space B is adjusted to not more than five times the thickness of the master disk 44A or 44B.

The thickness t of the outside spacer 6 is selected not to be larger than the sum of the thicknesses of the slave disk 42 and transfer layers 43 by more than 0.2 mm. The width of each space C is adjusted to not more than 0.2 mm.

Figure 11:
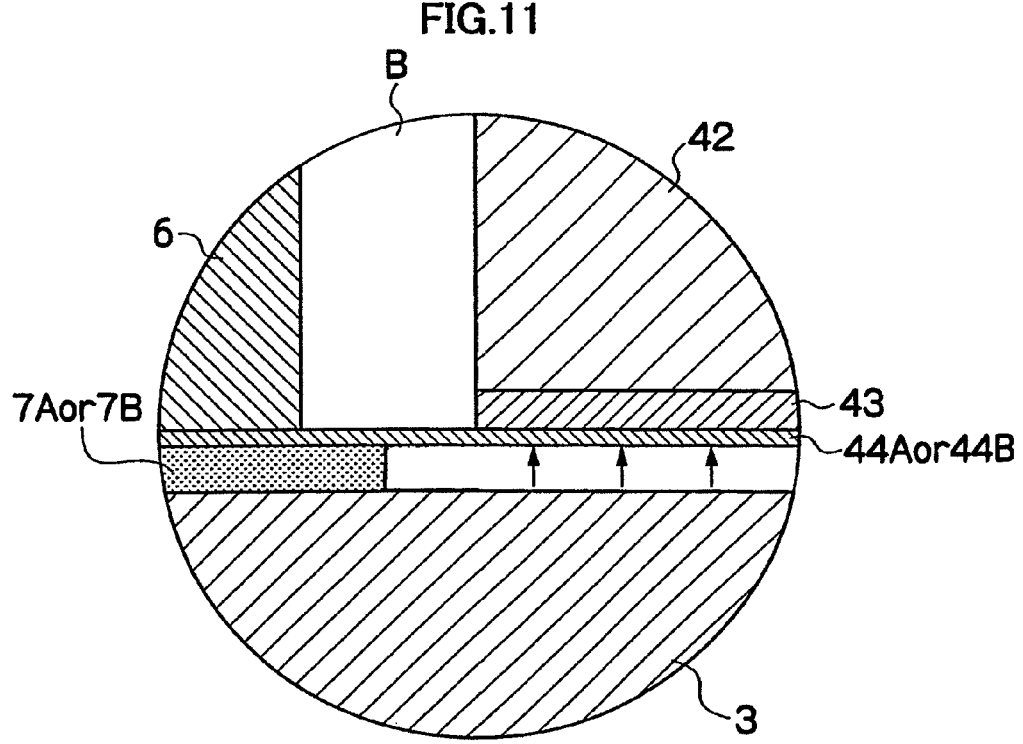
FIG. 11 is an enlarged sectional view showing a fixed state in the fourth embodiment of the present invention.

FIG. 11 is an enlarged sectional view showing a fixed state in the fourth embodiment of the present invention. By making the inside diameter of the sealing member 7A or 7B close to the outside diameter of the slave disk 42, as shown in FIG. 11, and fixing the master disk 44A or 44B to the sealing member 7A or 7B, the width of a portion of the master disk 44A or 44B, the portion is unfixed and adjacent to the space B may be set to not more than five times the thickness of the master disk 44A or 44B.

In the transfer apparatus with the above-described configuration, when information bearing surfaces of the master disks 44A and 44B are to be brought into close contact with the transfer layers 43 of the slave disk 42 by a predetermined pressing force, the container upper portion 2 and container lower portion 3 are first coupled together by the fastening device 9. This operation forms a void surrounded by the container upper portion 2, sealing member 7A and master disk 44A, and a void surrounded by the container lower portion 3, sealing member 7B and master disk 44B.

In this state, fluid with a pressure of 0.1 to 1 MPa is supplied to the voids from the fluid source (not shown) through the respective joints 8A and 8B. With this operation, the master disks 44A and 44B are uniformly pressed all over pressed regions whose widths are equal to the inside diameters of the sealing members 7A and 7B. Letting d be a thickness and E be a Young's modulus and assuming that the widths of the pressed regions under the pressure of the fluid are 1 m, the master disks 44A and 44B each have a rigidity which satisfies the following relation: $dE^3/12 \leqq 8 N \cdot m^2$.

The pressed master disks 44A and 44B come into close contact with the transfer layers 43 with predetermined pressing forces. Since the pressing forces are produced by fluid, pressurization is uniform over the pressed regions. In addition, since the fluid is supplied from a single pipeline, the pressing forces applied to the master disks 44A and 44B in close contact with the transfer layers 43 are equal.

The master disks 44A and 44B are adjusted such that they do not cave in toward the adjusted space B and that the amount of deformation in each pressed region is small. The master disks 44A and 44B are also adjusted such that the amount of deformation at a portion corresponding to each adjusted space C is small.

Asperities formed on the master disks 44A and 44B are transferred onto the transfer layers 43, against which the master disks 44A and 44B are pressed. The transfer layers 43 are cured by irradiating with light, heating, or cooling the transfer layers 43 while the master disks 44A and 44B are pressed against the transfer layers 43 or after the master disks 44A and 44B are peeled from the transfer layers 43. The asperities as pieces of transfer information are transferred onto the slave disk 42, which becomes a recording medium.

EXAMPLES

Concrete examples of a transfer method, transfer apparatus, and recording medium according to the present invention will now be described.

FIG. 12 is a chart showing data obtained when pieces of transfer information represented by asperities formed on the master disks 10A and 10B were transferred by the transfer apparatus 1A shown in FIG. 4.

In transfer, master carriers for magnetic transfer (inside diameter: 20.0 mm, outside diameter: 65.0 mm, thickness: 0.30 mm) were used for each slave medium (inside diameter: 20.0 mm, outside diameter: 65.0 mm, thickness: 0.50 mm) which was manufactured by a known manufacturing method and was subjected to initial DC magnetization. The thicknesses of flexible films were set to 0.1 mm. Six combinations of the outside diameter and thickness of an inside spacer, the inside diameter and thickness of an outside spacer, the widths of spaces around the inner and outer peripheries of a slave medium, and the width of a space in the thickness direction of the slave medium were prepared, as shown in FIG. 12. Air with a pressure of 0.2 MPa was supplied, magnetic transfer was performed by a transfer method according to the present invention, and track signals were transferred from the master carriers onto the slave medium.

Evaluation of each slave medium after transfer was performed by an electromagnetic conversion characteristics measuring device (SS-60, made by KYODO DENSHI SYSTEM CO., LTD.). An inductive head having a head gap of 0.32 μm and a track width of 3.0 μm was used as a head. Signals of one track at a distance of 25 mm from the center of the slave medium were read by the head. Out-of-roundness was calculated from the positional information of the head obtained by removing components associated with vibrations of the head, eccentricity of a spindle, and the like from the signals.

As for each of slave media Nos. 1 to 4 meeting the conditions of the width of a space in a thickness direction being not more than 0.2 mm and the widths of spaces around the inner and outer peripheries of a slave medium being not more than five times the thickness of flexible films, i.e., not more than 0.5 mm, a satisfactory result was obtained: the out-of-roundness was not more than 500 nm, which is a threshold value for identifying good products.

Pieces of transfer information represented by asperities formed on the master disks 40A and 40B were transferred by the transfer apparatus 1B shown in FIG. 5. When a slave medium and master carriers were configured to meet the same conditions as those in the example using the transfer apparatus 1A, an inside spacer was configured to have an outside diameter of 19.95 mm and a thickness of 0.53 mm, and an outside spacer was configured to have an inside diameter of 65.05 mm and a thickness of 0.53 mm, a satisfactory result was also obtained: the out-of-roundness was 343 nm.

In the transfer apparatus 1C shown in FIG. 6, a nickel substrate having a thickness of 0.2 mm and a diameter of 65 mm on which a circular pattern concentric with the nickel substrate having a line width of 100 nm and a height of 100 nm was provided was used as each master carrier, and a glass substrate having a thickness of 0.5 mm and a diameter of 65 mm which was spin-coated with light-curing resin was used as a slave medium.

Films of PET resin having a thickness of 0.1 mm were additionally used as flexible films, an outside spacer was configured to have an inside diameter of 65.05 mm and a thickness of 0.53 mm, and the pressure of air to be supplied was set to 0.1 MPa. Under these conditions, transfer of the circular pattern onto the slave medium was performed while pressing the master carriers against the slave medium. A satisfactory result was obtained: the out-of-roundness of the transferred circular pattern measured by the roundness measuring machine was 220 nm.

Similarly, in the transfer apparatus ID shown in FIG. 7, a nickel substrate having a thickness of 0.3 mm and a diameter of 65 mm on which a circular pattern concentric with the nickel substrate having a line width of 100 nm and a height of 100 nm was provided was used as each master carrier, and a glass substrate having a thickness of 0.5 mm and a diameter of 65 mm which was spin-coated with light-curing resin was used as a slave medium.

An outside spacer was configured to have an inside diameter of 65.05 mm and a thickness of 0.53 mm, and the pressure of air to be supplied was set to 0.1 MPa. Under these conditions, transfer of the circular pattern onto the slave medium was performed while pressing the master carriers against the slave medium. A satisfactory result was obtained: the out-of-roundness of the transferred circular pattern measured by the roundness measuring machine was 480 nm.

As has been described above, according to a transfer method, transfer apparatus, and recording medium of embodiments of the present invention, deformation of a master carrier caused by a space left at the time of pressing is reduced, and it is possible to transfer asperities formed on the master carrier or transfer information represented by the asperities onto a slave medium with fidelity in the order of nanometers.

What is claimed is:

1. A transfer method for transferring asperities formed on a master carrier or transfer information represented by the asperities onto a slave medium, comprising the step of bringing the master carrier on which microscopic asperities are formed into close contact with the slave medium by pressing the master carrier by pressure of fluid in a direct manner or an indirect manner through a flexible film, wherein deformation of the master carrier or the flexible film in a pressed region where the pressure of the fluid is applied is prevented, and transfer is performed while the master carrier is in close contact with the slave medium.

2. A recording medium produced by transferring the asperities or the transfer information represented by the asperities onto the slave medium by using the transfer method according to claim 1.

3. The transfer method according to claim 1, wherein the deformation of the master carrier or the flexible film in the pressed region is prevented by adjusting a width of a space left in an in-plane direction of the slave medium and a width of a space left in a thickness direction of the slave medium.

4. The transfer method according to claim 3, wherein the width of the space left in the thickness direction of the slave medium is adjusted to not more than 0.2 mm.

5. The transfer method according to claim 3, wherein the space left in the in-plane direction of the slave medium is a space left between the slave medium and a spacer which is arranged around an inner periphery or an outer periphery of the slave medium at the time of transfer and has a shape corresponding to a shape of the inner periphery of the slave medium or a shape corresponding to a shape of the outer periphery of the slave medium, and the width of the space left in the in-plane direction of the slave medium is adjusted based on the shape of the spacer.

6. The transfer method according to claim 3, wherein
the space left in the thickness direction of the slave medium is a space left between the master carrier and the flexible film, and
the width of the space is adjusted based on a thickness of a spacer arranged around a periphery of the slave medium at the time of the transfer.

7. The transfer method according to claim 3, wherein
the space left in the thickness direction of the slave medium is a space left between the master carrier and the slave medium, and
the width of the space is adjusted based on a thickness of the spacer arranged around a periphery of the slave medium at the time of the transfer.

8. The transfer method according to claim 3, wherein
the width of the space left in the in-plane direction of the slave medium is adjusted by a position where an edge of the master carrier or the flexible film is fixed.

9. A recording medium produced by transferring the asperities or the transfer information represented by the asperities onto the slave medium by using the transfer method according to claim 3.

10. The transfer method according to claim 3, wherein
the width of the space left in the in-plane direction of the slave medium is adjusted to not more than five times a thickness of the master carrier or the flexible film.

11. The transfer method according to claim 10, wherein
the width of the space left in the thickness direction of the slave medium is adjusted to not more than 0.2 mm.

12. The transfer method according to claim 10, wherein
the space left in the in-plane direction of the slave medium is a space left between the slave medium and a spacer which is arranged around an inner periphery or an outer periphery of the slave medium at the time of transfer and has a shape corresponding to a shape of the inner periphery of the slave medium or a shape corresponding to a shape of the outer periphery of the slave medium, and the width of the space left in the in-plane direction of the slave medium is adjusted based on the shape of the spacer.

13. The transfer method according to claim 10, wherein
the space left in the thickness direction of the slave medium is a space left between the master carrier and the flexible film, and
the width of the space is adjusted based on a thickness of a spacer arranged around a periphery of the slave medium at the time of the transfer.

14. The transfer method according to claim 10, wherein
the space left in the thickness direction of the slave medium is a space left between the master carrier and the slave medium, and
the width of the space is adjusted based on a thickness of the spacer arranged around a periphery of the slave medium at the time of the transfer.

15. The transfer method according to claim 10, wherein
the width of the space left in the in-plane direction of the slave medium is adjusted by a position where an edge of the master carrier or the flexible film is fixed.

16. A recording medium produced by transferring the asperities or the transfer information represented by the asperities onto the slave medium by using the transfer method according to claim 10.

17. A transfer apparatus comprising:
a master carrier on which microscopic asperities are formed;
a slave medium onto which data is transferred; and
a pressure device which brings the master carrier into close contact with the slave medium by pressure of fluid, wherein
deformation of the master carrier or a flexible film placed between the master carrier and the slave medium in a pressed region where the pressure by the fluid is applied is prevented, and
the asperities or transfer information represented by the asperities are transferred onto the slave medium while the slave medium is in close contact with the master carrier.

* * * * *